United States Patent
Batonnet et al.

(10) Patent No.: US 11,761,346 B2
(45) Date of Patent: Sep. 19, 2023

(54) INLET CONE FOR AN AIRCRAFT TURBINE ENGINE AND ASSOCIATED AIRCRAFT TURBINE ENGINE

(71) Applicant: SAFRAN AIRCRAFT ENGINES, Paris (FR)

(72) Inventors: Baptiste Rene Roger Batonnet, Moissy-Cramayel (FR); Alban Francois Louis, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/596,405

(22) PCT Filed: Jun. 4, 2020

(86) PCT No.: PCT/HR2020/050954
§ 371 (c)(1),
(2) Date: Dec. 9, 2021

(87) PCT Pub. No.: WO2020/249888
PCT Pub. Date: Dec. 17, 2020

(65) Prior Publication Data
US 2022/0235670 A1    Jul. 28, 2022

(30) Foreign Application Priority Data
Jun. 14, 2019 (FR) .................... 1906348

(51) Int. Cl.
*F01D 25/02* (2006.01)
*B64C 11/14* (2006.01)
(Continued)

(52) U.S. Cl.
CPC .............. *F01D 25/02* (2013.01); *B64C 11/14* (2013.01); *B64D 15/16* (2013.01); *F01D 5/02* (2013.01);
(Continued)

(58) Field of Classification Search
CPC . F01D 25/02; F01D 5/02; B64C 11/14; B64D 15/16; F02C 7/047; F05D 2220/323; F05D 2240/24
See application file for complete search history.

(56) References Cited

U.S. PATENT DOCUMENTS 2,336,256 A * 12/1943 Junger .................... B64C 11/14
416/245 R
4,393,650 A * 7/1983 Pool ........................ F02C 7/047
60/39.093

(Continued)

FOREIGN PATENT DOCUMENTS

FR    2898939 A1    9/2007
FR    2943725 A1    10/2010
(Continued)

OTHER PUBLICATIONS

International Search Report received for PCT Patent Application No. PCT/FR2020/050954, dated Sep. 3, 2020, 6 pages (2 pages of English Translation and 4 pages of Original Document).

*Primary Examiner* — Steven M Sutherland
(74) *Attorney, Agent, or Firm* — WOMBLE BOND DICKINSON (US) LLP

(57) ABSTRACT

The present invention thus proposes an inlet cone for an aircraft turbine engine, comprising a frustoconical body and a tip made from elastically deformable material fixed to an end of smaller diameter of said body, the tip comprising a top configured to be situated on an axis of rotation of the cone and a fastening base for attachment on said end of said body. Said base extends in a connecting plane P. Said connecting plane P is inclined relative to said axis of rotation. Said base has a generally circular or oval shape. According to the invention, said connecting plane P is inclined relative to a transverse plane T perpendicular to said axis of rotation.

11 Claims, 3 Drawing Sheets

(51) Int. Cl.
*B64D 15/16* (2006.01)
*F01D 5/02* (2006.01)
*F02C 7/047* (2006.01)

(52) U.S. Cl.
CPC ........ *F02C 7/047* (2013.01); *F05D 2220/323* (2013.01); *F05D 2240/24* (2013.01)

(56) References Cited

U.S. PATENT DOCUMENTS

| | | | | |
|---|---|---|---|---|
| 2014/0255204 | A1* | 9/2014 | Totten | F01D 5/066 156/60 |
| 2016/0122034 | A1* | 5/2016 | Bortoli | F01D 25/02 416/142 |
| 2017/0211579 | A1* | 7/2017 | Klauke | F01D 25/06 |

FOREIGN PATENT DOCUMENTS

| | | |
|---|---|---|
| FR | 2943726 A1 | 10/2010 |
| FR | 3027878 A1 | 5/2016 |
| GB | 1557856 A | 12/1979 |

* cited by examiner

INLET CONE FOR AN AIRCRAFT TURBINE ENGINE AND ASSOCIATED AIRCRAFT TURBINE ENGINE

TECHNICAL FIELD OF THE INVENTION

The field of the present invention is that of turbine engines, in particular that of gas turbine engines, for example and not restrictively a turbojet engine or an aircraft turboprop.

The present invention relates more particularly to an air inlet cone for a turbine engine.

TECHNICAL BACKGROUND

The prior art comprises, in particular, the documents GB-A-1 557 856, FR-A1-2 943 726, FR-A1-3 027 878, FR-A1-2 943 725 and FR-A1-2 898 939.

It is known from the prior art that turbine engines extend along a longitudinal axis and comprise, from upstream to downstream, in the direction of gas flow, a fan, one or more compressor stages (e.g., a low-pressure compressor and a high-pressure compressor), a combustion chamber, one or more turbine stages (e.g., a high-pressure turbine and a low-pressure turbine), and a gas exhaust nozzle.

Conventionally, such turbine engines further comprise an upstream air inlet cone which is mounted on the fan, for example by means of a generally annular upstream shell which is itself connected to a low-pressure compressor shaft of the turbine engine. The connection between the inlet cone and the upstream shell is usually made by means of bolted joints. The downstream end of the shell is flush with the platforms of the fan blades, being in the front aerodynamic continuity of the latter.

Such an inlet cone comprises an upstream end in the form of a cone tip centred on an axis of rotation of the inlet cone, also corresponding to the longitudinal axis of the fan and the entire of the turbine engine.

This tip is known to be a point in the turbine engine that promotes ice accretion, since its centering on the axis of rotation does not allow the application of significant centrifugal forces. As a result, the ice forming on the inlet cone tip could grow to a large size before breaking off, with the risk, when it eventually disengages from the tip, of damaging the fan blades it strikes or the engine of the aircraft that ingests it. The ice pack can also accumulate unevenly on the tip of the inlet cone, resulting in undesirable vibrations of the turbine engine.

In order to overcome this problem, it has been proposed to so implement a de-icing system, the aim of which is to ensure that the ice accreted on the cone tip is ejected before it reaches a critical size. However, this type of system is expensive in terms of mass and size, and above all particularly difficult to implement due to the rotating nature of the inlet cone that is equipped with it.

It has also been proposed that the inlet cone 10, as shown in FIG. 2, be made with an upstream tip 11 of flexible material and a downstream body 12 of rigid material. In operation, the layer of ice accreted in particular at the level of the connection between the tip and the body is weakened to promote the detachment of the ice and thus reduce the size of the pieces of ice potentially ingested by the turbine engine. However, this way of detaching the ice layer, by embrittling it and allowing cracks to propagate along it, may be slower than expected in the case of in-flight operation of the turbine engine. Indeed, the larger the size of the ice layer, the slower and more difficult it is to form cracks in this layer.

Such a solution is therefore not sufficient to quickly and completely detach the ice layer forming on the tip of the inlet cone.

In this context, it is interesting to propose a solution to overcome the disadvantages of the prior art, in particular by implementing a geometry of an air inlet cone that is more conducive to the rapid break-up of the ice in operation.

SUMMARY OF THE INVENTION

The present invention thus proposes an inlet cone for an aircraft turbine engine, comprising a frustoconical body and a tip made from elastically deformable material fixed to an end of smaller diameter of said body, the tip comprising a top configured to be situated on an axis of rotation of the cone and a fastening base for attachment on said end of said body. Said base extends in a connecting plane P. Said connecting plane P is inclined relative to said axis of rotation. Said base has a generally circular or oval shape. Preferably, said connecting plane P is inclined relative to a transverse plane T perpendicular to said axis of rotation.

Such an oval may be regular by being symmetrical or asymmetrical as an egg which would be considered in section.

The inclination of the connecting plane P between the tip and the frustoconical body of the cone allows to design a tip made from elastically deformable material which is not axisymmetrical. This design has the advantage of amplifying the phenomenon of de-accretion of the ice forming on the air inlet cone of the turbine engine during operation.

Indeed, the tip of the inlet cone is made from an elastically deformable material, such as an elastomer, so as to allow the tip to deform as it rotates and also to withstand temperature variations. This therefore promotes the release of ice accretions forming on the surface of the inlet cone, as described above. Furthermore, in operation, when ice is accreted onto the upstream end of the inlet cone, the eccentric (or non-axisymmetric) shape of the inlet cone tip advantageously implies that the ice is subject to significant centrifugal forces. These forces promote its ejection, and allow it to separate from the inlet cone before it reaches a critical size with respect to the risk of damage to the fan blades situated downstream.

Thus, the eccentric shape of the tip made from elastically deformable material allows the displacements under the action of the centrifugal force to be de-symmetrized. This creates an unbalance at its end which promotes deformation of the elastically deformable material of the tip to create more cracks in the ice and eject it evenly before its volume becomes too large and dangerous in the event of ingestion into the turbine engine. Therefore, under the combined effect of centrifugal force and the radial pull of the ice (itself driven by this centrifugal force), the tip deforms more rapidly. This amplification of the deformation of the tip of the inlet cone therefore leads to an increase in the stresses applied to the ice, so as to increase the frequency of ice detachment. This ultimately leads to a reduction in the size of the ice fragments, and a reduction in the impact energies undergone by the turbine engine during ice detachment.

The invention therefore has the advantage of being based on a simple design, offering very high reliability, with little cost and space penalty.

The inlet cone for the aircraft turbine engine according to the invention may comprise one or more of the following features, taken in isolation from each other or in combination with each other:

said connecting plane P is inclined at an angle of between 10° and 35° relative to the transverse plane perpendicular to said axis of rotation;

the tip is single part;

the tip is bound to the body;

one of the elements chosen from the tip and the body comprises at least one lug engaged in a recess of the other of the elements, in order to block the tip in rotation on the body and/or facilitate the centering of the tip on the body;

the body is made of composite or metallic material;

the tip is made of elastomer.

The invention also relates to an aircraft turbine engine comprising an inlet cone according to the invention.

BRIEF DESCRIPTION OF THE FIGURES

The invention will be better understood and other details, characteristics and advantages of the invention will become clearer on reading the following description made by way of non-limiting example and with reference to the attached drawings in which.

DETAILED DESCRIPTION OF THE INVENTION

By convention in the present application, the terms "interior" and "exterior", and "inner" and "outer" are defined radially with respect to a longitudinal axis X of the aircraft engine of the turbine engine. Thus, a cylinder extending along the axis X of the engine comprises an interior surface facing the axle of the engine and an exterior surface opposite its interior surface. "Axial" or "axially" means any direction parallel to the axis X and "transversely" or "transverse" means any direction perpendicular to the axis X. Similarly, the terms "upstream" and "downstream" are defined with respect to the direction of airflow in the turbine engine.

Figure 1:
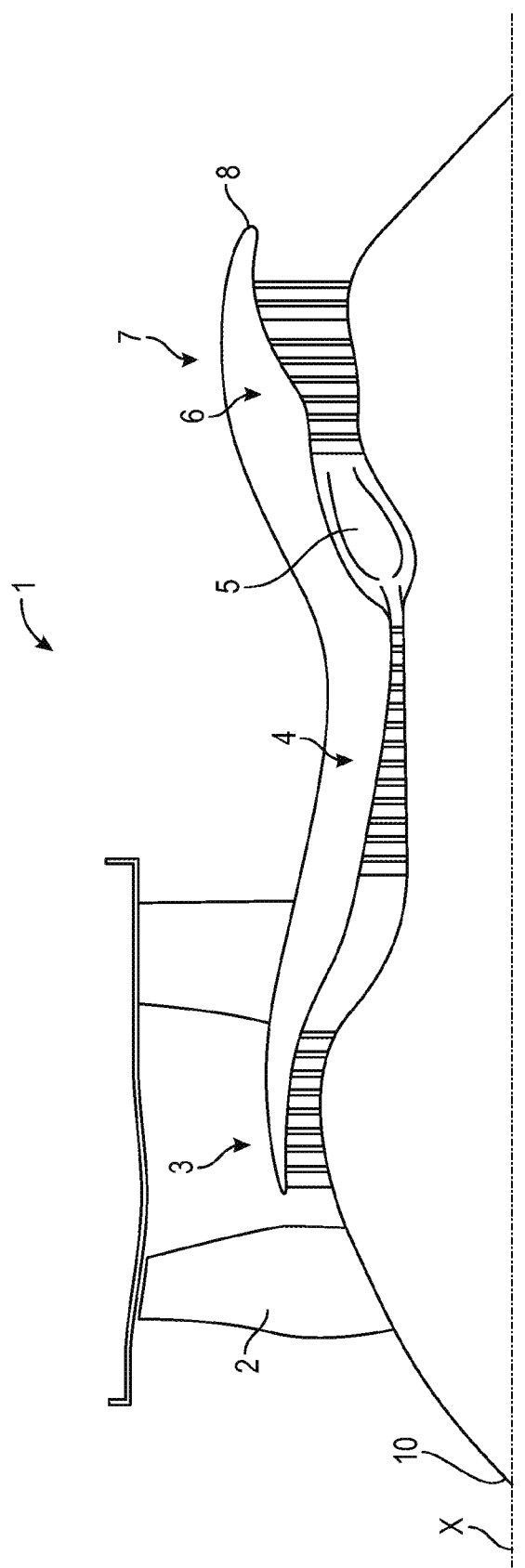
FIG. 1 is a schematic half-view in axial section of an aircraft turbine engine, according to one of the embodiments of the invention.

FIG. 1 shows a turbine engine 1 with dual flow. However, this is not limiting and the turbine engine may be of another type, such as for example a turboprop engine.

The turbine engine 1 extends along a longitudinal axis X and comprises from upstream to downstream, in the direction of the gas flow, a fan 2, one or more compressor stages (e.g. a low-pressure compressor 3 and a high-pressure compressor 4), a combustion chamber 5, one or more turbine stages (e.g. a high-pressure turbine 6 and a low-pressure turbine 7), and a gas exhaust nozzle 8. The fan 2, the low-pressure compressor 3 and the low-pressure turbine 7 are connected to a low-pressure shaft extending along the longitudinal axis. The high-pressure compressor 4 and the high-pressure turbine 6 are connected to a high-pressure shaft arranged around the low-pressure shaft. The low-pressure turbine 7 drives the low-pressure shaft in rotation, while the high-pressure turbine 6 drives the high-pressure shaft in rotation.

The turbine engine 1 further comprises, upstream of the fan 2, an air inlet cone 10 which is mounted on the fan 2 by means of a shell (not shown), preferably by bolt-type attachment. The shell is arranged downstream of the inlet cone 10 and this shell is also connected to the low-pressure shaft.

The inlet cone 10 together with the shell are connected to the rotor, i.e. to the rotating parts of the turbine engine 1. The inlet cone 10 therefore rotates around the longitudinal axis X.

Figure 2:
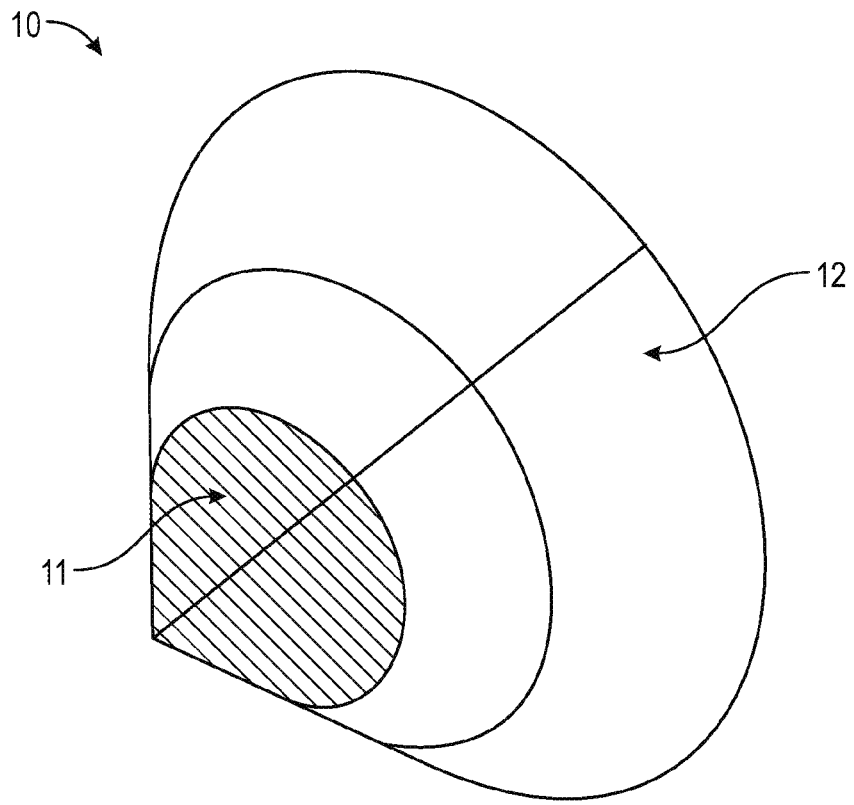
FIG. 2 is a schematic front perspective view of an inlet cone, according to the prior art.
Figure 3:
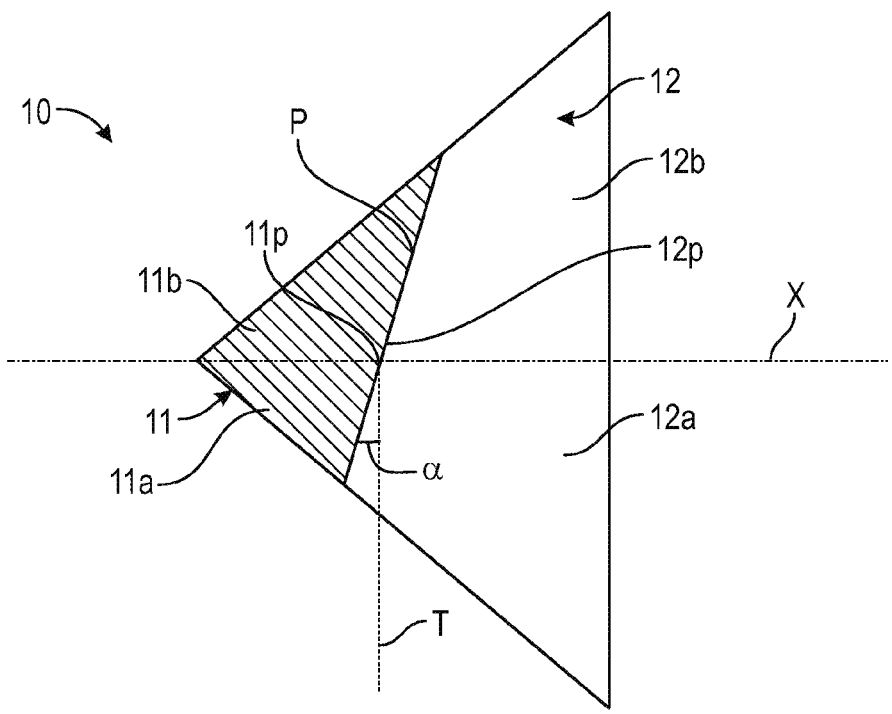
FIG. 3 is a schematic view in axial section of an inlet cone, according to one embodiment of the invention.
Figure 4:
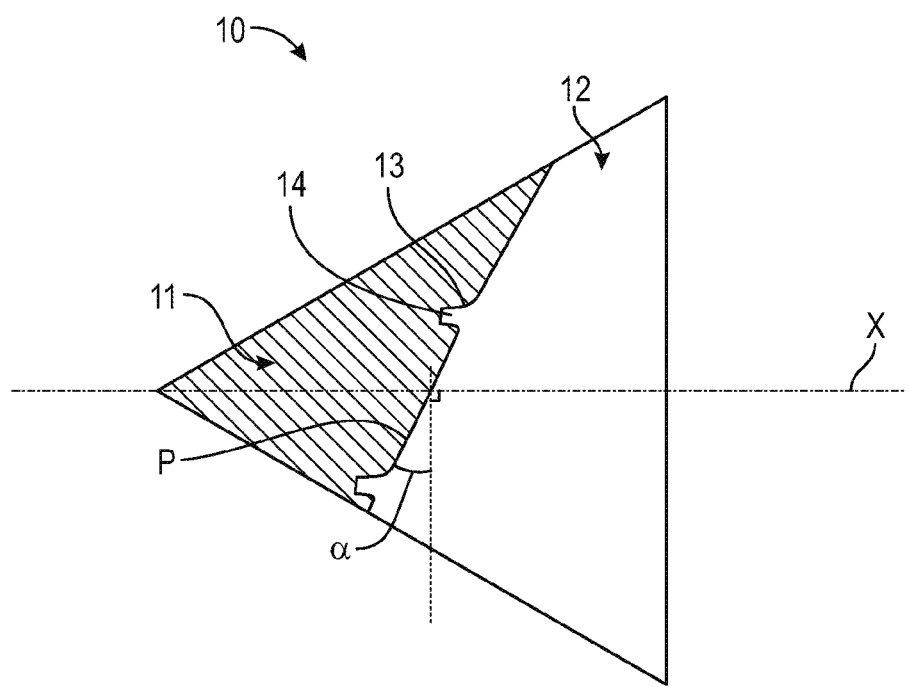
FIG. 4 is a schematic view in axial section of an inlet cone, according to another embodiment of the invention.

The air inlet cone is shown in more detail in FIGS. 2 to 4.

FIG. 2 shows the inlet cone 10 of the prior art, as previously described, in the technical background of the present application.

FIG. 3 shows the inlet cone 10 according to the invention, which comprises a tip 11 disposed upstream and a frustoconical body 12 disposed downstream. In operation, the inlet cone 10 rotates about the longitudinal axis X.

The tip 11 of the cone 10 is made from elastically deformable material. For example, this tip 11 may comprise an elastomer or silicone material. The frustoconical body 12 of the inlet cone is made of a material which is more rigid than the tip 11. For example, this frustoconical body 12 may be made of a metallic or composite material.

The tip 11 comprises a top through which the axis of rotation X of the inlet cone 10 passes, which is therefore coincident with the longitudinal axis X of the turbine engine. On the side opposite the top, the tip 11 also comprises a fastening base 11p for attachment to an upstream end 12p of the frustoconical body 12 in order to be aerodynamically continuous. The frustoconical body 12, in turn, comprises the upstream end 12p and a downstream end which is configured to assemble with the front shell on the fan 2 of the turbine engine. The upstream end 12p attaches to the fastening base 11p of the tip 11, and has a diameter smaller than the diameter of the downstream end of the frustoconical body 12.

The fastening base 11p and the upstream end 12p of the frustoconical body 12 have a generally circular or oval shape, preferably complementary to each other, and extend in a connecting plane P.

One of the particularities of the invention lies in the fact that this connecting plane P is inclined with respect to the axis X of rotation of the inlet cone, preferably with respect to a transverse plane T perpendicular to the axis X. This gives the tip 11 its eccentric shape. The connecting plane P may be inclined at an angle α to the transverse plane T perpendicular to the axis X. The angle α may be between 10° and 35° relative to the axis X. Preferably, the angle α is between 15° and 25°. The angle α of the connecting plane P is, for example, chosen as a function of the size of the inlet cone, the speed of rotation of the cone and/or the type of turbine engine.

The connecting plane P is positioned so as to define a centre of gravity of the inlet cone offset from its geometrical axis. This causes an imbalance or unbalance in the tip during operation, and advantageously favours the stalling of the ice that forms on the tip during operation.

According to the invention illustrated in FIG. 3, the fastening base 11p of the tip 11 is glued to the upstream end 12p, so as to assemble the tip to the frustoconical body in an efficient and simple manner, while limiting the size of the air inlet cone.

According to the invention illustrated in FIG. 4, the frustoconical body 12 may comprise one or more lugs 14 engaging in a recess 13 of the tip 11, so as to lock the tip to the frustoconical body in rotation and/or to facilitate the centering of the tip on the body. The lugs 14 are distributed around the circumferential periphery of the upstream end 12p of the frustoconical body 12. The recesses 13 are also distributed around the circumferential periphery of the fastening base 11p of the tip 11.

The tip 11 of the inlet cone 10 may be monobloc. For example, an elastomer tip 11 can be made by moulding, while optimising the draft angles and thicknesses to respect the constraints linked to the moulding and demoulding technique.

The tip 11 can be applied to any type of air inlet cone of a turbine engine, while adapting the angles and lengths of the tip to the dimensions of the inlet cone. Furthermore, the hardness of the tip, made from elastically deformable material, is a parameter that can be varied according to the speed of rotation, the angle of attack and the dimensions of the inlet cone.

The design of the air inlet cone according to the invention brings several advantages, which are, in particular:
- weakening a significant size of the ice layer accreted to the air inlet cone, and increasing the frequency of ice detachment;
- amplifying effectively and rapidly the break-up of the ice sheet forming on the inlet cone;
- reducing the impact on the turbine engine during the break-up of the ice;
- simplify and unclutter the assembly and the operation of the inlet cone on the turbine engine;
- easily adaptable to current turbine engine.

Overall, this proposed solution is simple, effective and economical to build and assemble on a turbine engine, while ensuring ice de-accretion and an optimum service life of the air inlet cone.

The invention claimed is:

1. An inlet cone for an aircraft turbine engine, comprising a frustoconical body and a tip made from elastically deformable material fixed to an end of smaller diameter of said frustoconical body, the tip comprising a top configured to be situated on an axis of rotation of the inlet cone and a fastening base on said end, wherein said fastening base has a generally rounded or oval shape, which fastening base extends in a connecting plane P and said connecting plane P is inclined relative to a transverse plane perpendicular to said axis of rotation.

2. The inlet cone according to claim 1, wherein said connecting plane P is inclined at an angle ($\alpha$) of between 10° and 35° relative to the transverse plane.

3. The inlet cone according to claim 1, wherein the tip is single part.

4. The inlet cone according to claim 1, wherein the tip is bound to the frustoconical body.

5. The inlet cone according to claim 1, wherein one of the elements chosen from the tip and the frustoconical body comprises at least one lug engaged in a recess of the other of the elements, in order to block the tip in rotation on the frustoconical body and/or facilitate the centering of the tip on the frustoconical body.

6. The inlet cone according to claim 5, wherein said at least one lug is distributed around a circumferential periphery of an upstream end of the frustoconical body and the at least one recess is distributed around a circumferential periphery of the fastening base of the tip.

7. The inlet cone according to claim 1, wherein the frustoconical body is made of composite or metallic material.

8. The inlet cone according to claim 1, wherein the tip is made of elastomer.

9. An aircraft turbine engine, comprising an inlet cone according to claim 1.

10. An inlet cone for an aircraft turbine engine, the inlet cone comprising:
- an axis of rotation,
- a frustoconical body comprising a first end with a smaller diameter and a second end with a greater diameter and opposed to said first end, and
- a tip made from elastically deformable material fixed to the first end, the tip comprising:
  - a top configured to be situated on the axis of rotation, and
  - a fastening base on said first end of the frustoconical body,
- wherein said fastening base has a generally oval shape, which extends in a connecting plane P and said connecting plane P is inclined relative to a transverse plane perpendicular to said axis of rotation.

11. An inlet cone for an aircraft turbine engine, comprising a frustoconical body and a tip made from elastically deformable material fixed to an end of smaller diameter of said frustoconical body, the tip comprising a top configured to be situated on an axis of rotation of the inlet cone and a fastening base on said end,
- wherein said fastening base has a generally oval shape, which extends in a connecting plane P and said connecting plane P is inclined relative to a transverse plane perpendicular to said axis of rotation, and
- wherein one of the elements chosen from the tip and the frustoconical body comprises at least one lug engaged in a recess of the other of the elements, in order to block the tip in rotation on the frustoconical body and/or facilitate the centering of the tip on the frustoconical body.

* * * * *